Figure 1:
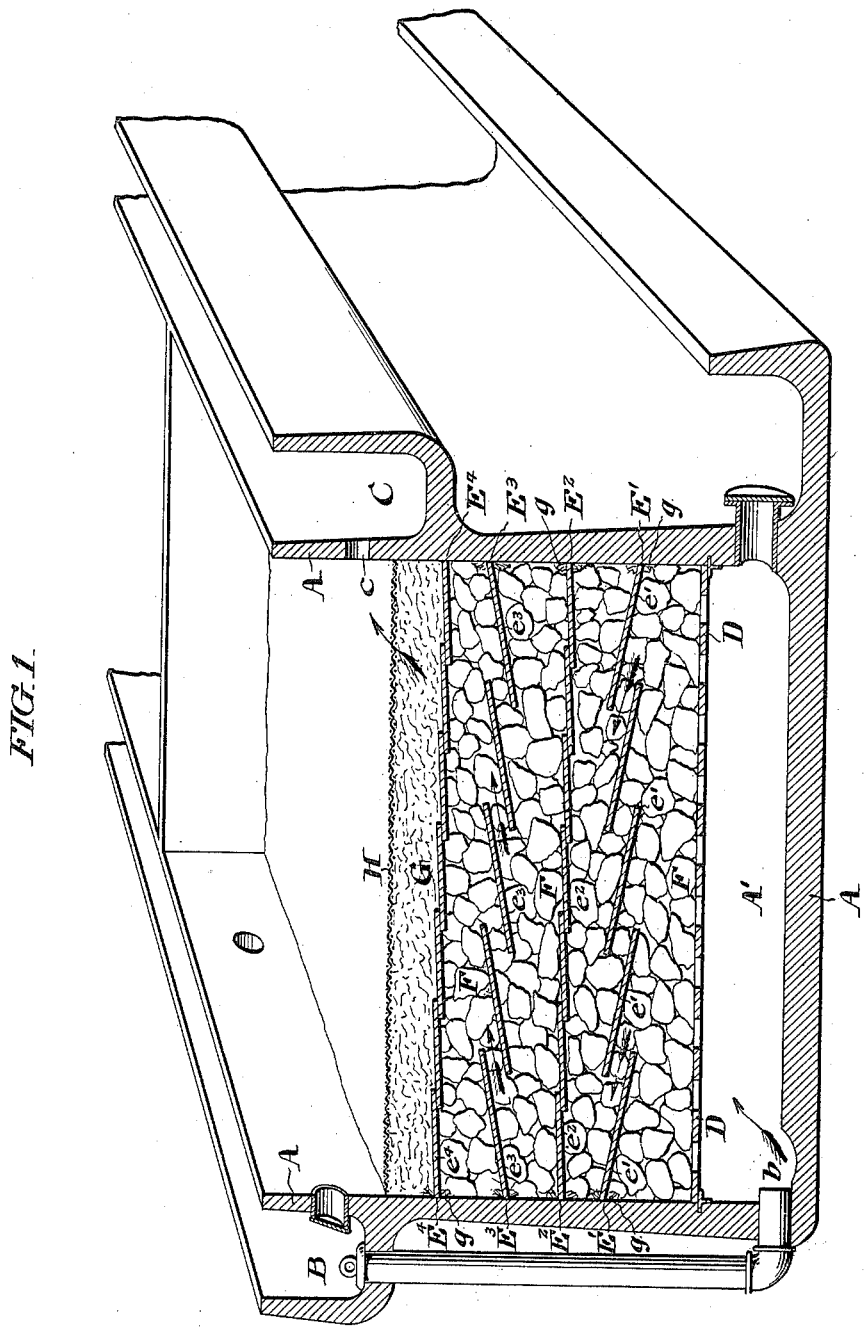

No. 661,316. Patented Nov. 6, 1900.
J. A. MAIGNEN.
DECANTATION APPARATUS.
(Application filed Apr. 18, 1900.)

(No Model.) 2 Sheets—Sheet 1.

WITNESSES:
Clifton C. Hallowell
E. L. Fullerton.

INVENTOR:
JEAN A. MAIGNEN
by Arthur E. Paige
Atty.

No. 661,316. Patented Nov. 6, 1900.
J. A. MAIGNEN.
DECANTATION APPARATUS.
(Application filed Apr. 18, 1900.)
(No Model.) 2 Sheets—Sheet 2.
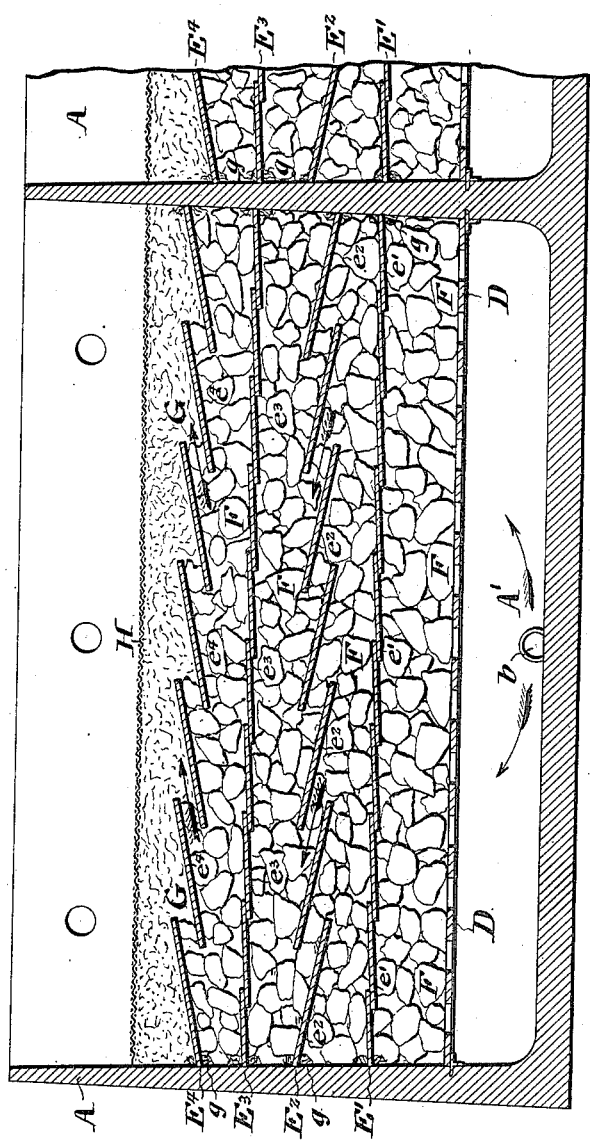
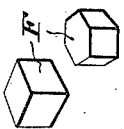
WITNESSES:
Clifton C. Hallowell
E. L. Fullerton
INVENTOR:
JEAN A. MAIGNEN
by Arthur E. Paige
Atty.

UNITED STATES PATENT OFFICE.

JEAN A. MAIGNEN, OF PHILADELPHIA, PENNSYLVANIA.

DECANTATION APPARATUS.

SPECIFICATION forming part of Letters Patent No. 661,316, dated November 6, 1900.

Application filed April 18, 1900. Serial No. 13,294. (No model.)

*To all whom it may concern:*

Be it known that I, JEAN A. MAIGNEN, of Philadelphia, in the State of Pennsylvania, have invented certain new and useful Improvements in Decantation Apparatus, whereof the following is a specification, reference being had to the accompanying drawings.

My invention relates to apparatus wherein particles of matter suspended in liquids may be separated therefrom by subsidence of the particles due to the difference in specific gravity between the matter in suspension and the liquid in which it is suspended, such a process being differentiated from the process of filtration in that the separation in the decantation process is due to gravitation, while in a filtering process the result is secured by screening. Ordinarily the process of decantation consists in permitting a body of liquid to remain quiescent in what is termed a "sedimentation" basin or tank until the suspended matter gravitates to the bottom of the liquid, the upper strata of clear liquid in the tank being removed at intervals and a corresponding quantity of raw liquid introduced to replace the same. However, the ordinary process aforesaid requires such an extent of time for its completion that the apparatus comprising such sedimentation basin or tank must be correspondingly extensive and costly in proportion to its output of decanted and clarified liquid.

Therefore it is the object of my invention to provide an apparatus wherein the liquid to be decanted shall be divided into shallow layers or streams and so disposed that the subsidence of the matter suspended therein shall be immediately secured, with a consequent maximum output of clarified liquid from an apparatus of given dimensions.

My invention consists in providing an apparatus wherein the liquid is entered at the bottom and discharged at the top and in passing from the inlet to the outlet is compelled to take a tortuous path, as hereinafter more definitely specified, by means of deflecting-diaphragms arranged in combination with impedimentors—such as bricks or other geometrical blocks, broken stone, coke, or the like—so coarse and loose as not to interfere materially with the speed of passage of the liquid, the arrangement of the parts being such, however, as to divide the liquid into small streams, break the force of its movement, and form eddies and quiet places behind the impedimentors throughout the apparatus, in which eddies and quiet places the matter normally suspended in the liquid is deposited.

In the accompanying drawings, Figure 1 is a sectional perspective view of an apparatus conveniently embodying my invention. Fig. 2 is a sectional view of said apparatus, taken at right angles to the plane of section in Fig. 1. Fig. 3 shows details of geometrical blocks.

In said figures, A is the inclosing casing, having a bottom inlet $b$ for the liquid and a liquid-discharge outlet $c$ at the top thereof, the former being in communication with the conduit B and the latter in communication with the conduit C, conveniently formed in integral relation with the casing A. I prefer to provide the chamber A' at the bottom of said casing A in order to conveniently distribute the incoming liquid over the area of the screen D, which serves as a convenient support for the impedimentor contents of said casing. The diaphragms $E'$ $E^2$ $E^3$ $E^4$ are arranged in vertical series within said casing and comprise overlapping courses of plates or tiles, (respectively marked $e'$ $e^2$ $e^3$ $e^4$.) All of said courses are slightly inclined in an upward direction; but the lateral direction of inclination is different in the respective diaphragms—that is to say, referring to Fig. 1, the courses of the diaphragm $E'$ incline upwardly to the left, the courses of the diaphragm $E^2$ incline upwardly toward the observer, the courses of the diaphragm $E^3$ incline upwardly toward the right, and the courses of the diaphragm $E^4$ incline upwardly away from the observer—so that the liquid inlet at $b$ is compelled to take a tortuous path through the diaphragms $E'$ to $E^4$, inclusive, and at each diaphragm to change the direction of its traverse. The spaces between said diaphragm and between the respective courses comprising them are filled with impedimentors F, consisting of bricks or geometrical blocks, as shown in Fig. 3, or fragments of broken stone, coke, or the like, such as indicated in Figs. 1 and 2. It is to be noted that the interstices between said impedimentors are of such size as not to have any screening effect whatever upon the liquid which passes therethrough, which is caused to deposit its suspended matter within the eddies and quiet places formed behind the blocks or fragments F. The arrangement described is such that the "downhill" faces, so to speak, of the impedimentors are washed clean by the uprising liquid, whereas the uphill faces of said impedimentors are covered by the adherent deposited sediment.

In order that the flow of liquid through the apparatus may be further checked and equalized, I prefer to provide above the upper diaphragm E⁴ a layer of buoyant elastic material G—such as peat fiber, cornstalk, or any suitable inorganic material—held down by suitable means, such as wire screening H. I also find it desirable to interpose such elastic material between the edges of said diaphragms and the adjoining walls of said inclosing casing, as indicated at g, in order to prevent a direct passage of liquid through the apparatus at said joints.

It is to be noted that the peculiar arrangement of the parts above described is such that the deposit of sediment upon the uphill side of the impedimentors F, &c., may be readily discharged from the apparatus by flushing the latter with liquid in a downward direction, the rush of the wash liquid and the gravitation of the sediment both serving to discharge the latter from the apparatus.

The operation of the apparatus above described is not filtration, for the latter is necessarily a screening operation, whereas within the apparatus which I have described the passages for the liquid are always one hundred times or more wider than is necessary for the passage of the particles of matter suspended therein, the process carried out in said apparatus being sedimentation or decantation with checked and directed flow, which process may be carried on continuously or intermittently.

Certain characteristics of apparatus hitherto known may be here set forth in order that the advantages of my improvements may be noted as follows: Ordinary sedimentation-basins are not provided with means to divide the bulk of liquid treated, and the momentum of the incoming liquid tends to deliver it directly to the outlet. Moreover, the tendency aforesaid is augmented by the difference in temperature existing between the incoming liquid and that in the basin, which prevents the mixture of the stream of incoming liquid with the surrounding liquid. By my improvements the bulk of liquid treated is divided into small portions and the sediment deposited in the eddies behind the impedimentors in the course of the liquid in the same manner as such deposits are made in a natural stream behind stones or other obstructions where eddies are formed, and said liquid is compelled to traverse the entire extent of the path provided for it, regardless of its momentum or any difference in temperature such as aforesaid. The course of the liquid treated in sedimentation-basins may be predetermined by baffle-plates; but the use of such plates without combination with the other means which I have specified does not sufficiently divide the liquid to produce the peculiar sedimentation or decantation effect of the eddies secured by the combination which I have specified.

I do not desire to limit myself to the precise details of the apparatus which I have shown and described, as it is obvious that various modifications may be made therein without departing from the essential features of my invention.

I claim—

1. In a decantation apparatus, the combination with an inclosing casing, of an inlet for liquid at the bottom of said casing, an outlet for liquid at the top of said casing, a series of diaphragms comprising courses of plates or tiles slightly inclined in an upward direction, and coarse granular material interposed between said diaphragms, substantially as set forth.

2. In a decantation apparatus, the combination with an inclosing casing, of an inlet for liquid at the bottom of said casing, an outlet for liquid at the top of said casing, a series of diaphragms comprising courses of plates or tiles slightly inclined in an upward direction, and geometrical blocks or fragments of material interposed between said diaphragms, substantially as set forth.

3. In a decantation apparatus, the combination with an inclosing casing, of an inlet for liquid at the bottom of said casing, an outlet for liquid at the top of said casing, a series of diaphragms comprising courses of plates or tiles slightly inclined in an upward direction, coarse granular material interposed between said diaphragms, a layer of buoyant elastic material above the upper diaphragm, and means to prevent the displacement of said buoyant material, substantially as set forth.

4. In a decantation apparatus, the combination with an inclosing casing, of an inlet for liquid at the bottom of said casing, an outlet for liquid at the top of said casing, a series of diaphragms comprising courses of plates or tiles slightly inclined in an upward direction, the lateral direction of inclination of said plates or tiles being different in the adjoining diaphragms, and coarse granular material interposed between said diaphragms substantially as set forth.

5. In a decantation apparatus, the combination with an inclosing casing, of an inlet for liquid at the bottom of said casing, an outlet for liquid at the top of said casing, a series of diaphragms comprising courses of plates or tiles slightly inclined in an upward direction, the lateral direction of inclination of said plates or tiles being different in the adjoining diaphragms, coarse granular material interposed between said diaphragms, a layer of buoyant elastic material above the upper diaphragm, and means to prevent the displacement of said buoyant material, substantially as set forth.

6. In a decantation apparatus, the combination with an inclosing casing, of an inlet for liquid at the bottom of said casing, an outlet for liquid at the top of said casing, a series of diaphragms comprising courses of plates or tiles slightly inclined in an upward direction, the lateral direction of inclination of said plates or tiles being different in the adjoining diaphragms, coarse granular material interposed between said diaphragms, and elastic material between the edges of said diaphragms and the adjoining wall of said inclosing casing, substantially as set forth.

JEAN A. MAIGNEN.

Witnesses:
  ARTHUR E. PAIGE,
  E. L. FULLERTON.